United States Patent [19]
Sayre

[11] 4,209,231
[45] Jun. 24, 1980

[54] HELIOSTAT ASSEMBLIES

[75] Inventor: Robert K. Sayre, Mt. Lebanon, Pa.

[73] Assignee: Westinghouse Electric Corp., Pittsburgh, Pa.

[21] Appl. No.: 936,420

[22] Filed: Aug. 24, 1978

[51] Int. Cl.² ............................................. G02B 7/18
[52] U.S. Cl. .................................................. 350/292
[58] Field of Search ...................... 350/289, 292, 299; 353/3; 126/270, 271

[56] References Cited
U.S. PATENT DOCUMENTS

| | | | |
|---|---|---|---|
| 1,683,266 | 9/1928 | Shipman | 126/271 |
| 1,951,404 | 3/1934 | Goddard | 350/292 |
| 4,129,360 | 12/1978 | Deflandre et al. | 350/289 |

*Primary Examiner*—Jon W. Henry
*Attorney, Agent, or Firm*—Edward L. Levine; Z. L. Dermer

[57] ABSTRACT

Heliostat assemblies, including fabrication methods, providing capability for azimuthal and elevational sun-tracking. A plurality of mirrors are affixed in a rectangular array which is diametrically mounted within a pair of circular rims which extend perpendicular to the mirror array. A belt-type drive rotates the rims on load-bearing rollers to adjust the elevational orientation of the mirror assembly, and a second drive rotates a carriage upon which the rollers are mounted to adjust the azimuthal orientation of the mirror assembly. Lightweight compression members and sectional shapes transfer loads among the assembly components, including tension cables which assist in transmitting loads between the elevation rims and the mirror assembly.

12 Claims, 10 Drawing Figures

FIG. I

HELIOSTAT ASSEMBLIES

BACKGROUND OF THE INVENTION

1. Field of the Invention

This invention relates to heliostats, and methods of fabricating the same, useful in concentrating radiant energy upon a remote absorber, and particularly provides a mirror assembly rotatable in azimuthal and elevational directions to track the apparent motion of the sun.

2. Description of the Prior Art

Increasing energy concerns have focussed substantial attention upon new methods for harnessing solar energy. While a large number of heliostat or reflector assemblies have been proposed, it has proven difficult to combine, in a given unit, properties which provide sufficient efficiency and response to external loads as well as an economical fabrication cost.

Typical of proposed central-station power plants are those which rely on large arrays of mirrors for concentration of solar energy upon a remote receiver. For example, in a 100 megawatt-electrical solar power plant the outermost mirrors may be 3500 to 4000 feet from the receiver and there can be about 40,000 mirror assemblies, each of 40 square meters, in the mirror field.

It will be evident that the mirror field can be the most costly item in a solar plant and, therefore, lessening the cost of the mirror assemblies is one of the most meaningful steps toward commercializing solar power.

Currently proposed glass mirror assemblies are fabricated by the assembly of a large supporting frame, the mounting of separate mirrors upon the frame, followed by aiming or focussing of the separate mirrors to a common focal point. Such fabrication procedures lead to large individual mirrors to reduce the number of fabrication and aiming operations. Larger mirrors are typically more costly and heavy since the glass thickness is increased due to its fragile nature.

Additionally, proposed mirrors appear to be supported from the back with edges bare, as a peripheral frame does not lend itself to attaching to the mirror supporting frame. Such arrangements are not optimum since the edge of a mirror is the most vulnerable location for crack initiation. Further, back support of mirrors means the glass-silver bond is mechanically loaded, and the bond typically is not as strong as the glass itself. And, leaving the edges of a mirror bare opens the possibility that moisture will penetrate between the glass and silver, leading to peeling of the silver.

Proposed designs which utilize flat mirror panels also tend to lack torsional rigidity. To achieve torsional rigidity in a lightweight structure requires depth in the structure, which is not compatible with proposed flat mirror panel designs. Proposed solutions add substantial weight and cost to the structures.

It will be apparent that provision of a lightweight, sufficiently rigid mirror assembly which alleviates the discussed concerns will hasten the large scale commercial utilization of solar radiant energy.

SUMMARY OF THE INVENTION

This invention provides improved heliostat assemblies and methods of fabricating such assemblies. In one preferred form the assembly includes a plurality of flat mirrors, for tracking the apparent motion of the sun and reflecting solar radiation to a remote receiver, affixed in a flat rectangular array or an array having a large radius of curvature. Extending perpendicular to the mirror array is a pair of spaced circular elevation rims arranged such that the width of the rectangular array is diametrically disposed within the rims. The rims are supported on elevation rollers and are driven by a belt-drive type system to vary the elevation angle of the heliostat assembly. The elevation rollers are mounted upon a frame structure which cooperates with a second group of rollers and a belt-type drive to vary the azimuthal position of the assembly. The structures of the system foundation and the elevational and azimuthal belt-type drives allow particulates such as sand to pass through the system without detrimental accumulation.

The elevation rims are joined to one another and to the mirror assembly by tension and other members, including lightweight cables and truss bars. The entire assembly can be made relatively light by fabricating the mirror assembly from flanged components arranged on a reference frame and bonding individual mirrors to the flanges while aiming spacers positioned between the flanged components properly orient the mirror faces. Spring-loaded clips further maintain the individual mirrors in position, and result in easily replaceable mirrors, if necessary.

The preferred construction uses thin, commonly available sections which provide rigidity and strength through section shape and avoidance of heavy structural beams and supports. The overall assembly is inherently strong and rigid in both the torsional and bending modes. The assembly further presents a low and wide stance which provides a high resistance to overturning moments under storm conditions, additional drive advantages and torsional rigidity, as well as the capability to easily place the mirrors in a face-down orientation.

BRIEF DESCRIPTION OF THE DRAWINGS

The advantages, nature and additional features of the invention will become more apparent from the following description, taken in connection with the accompanying drawings, in which.

DESCRIPTION OF THE PREFERRED EMBODIMENTS

Figure 1:
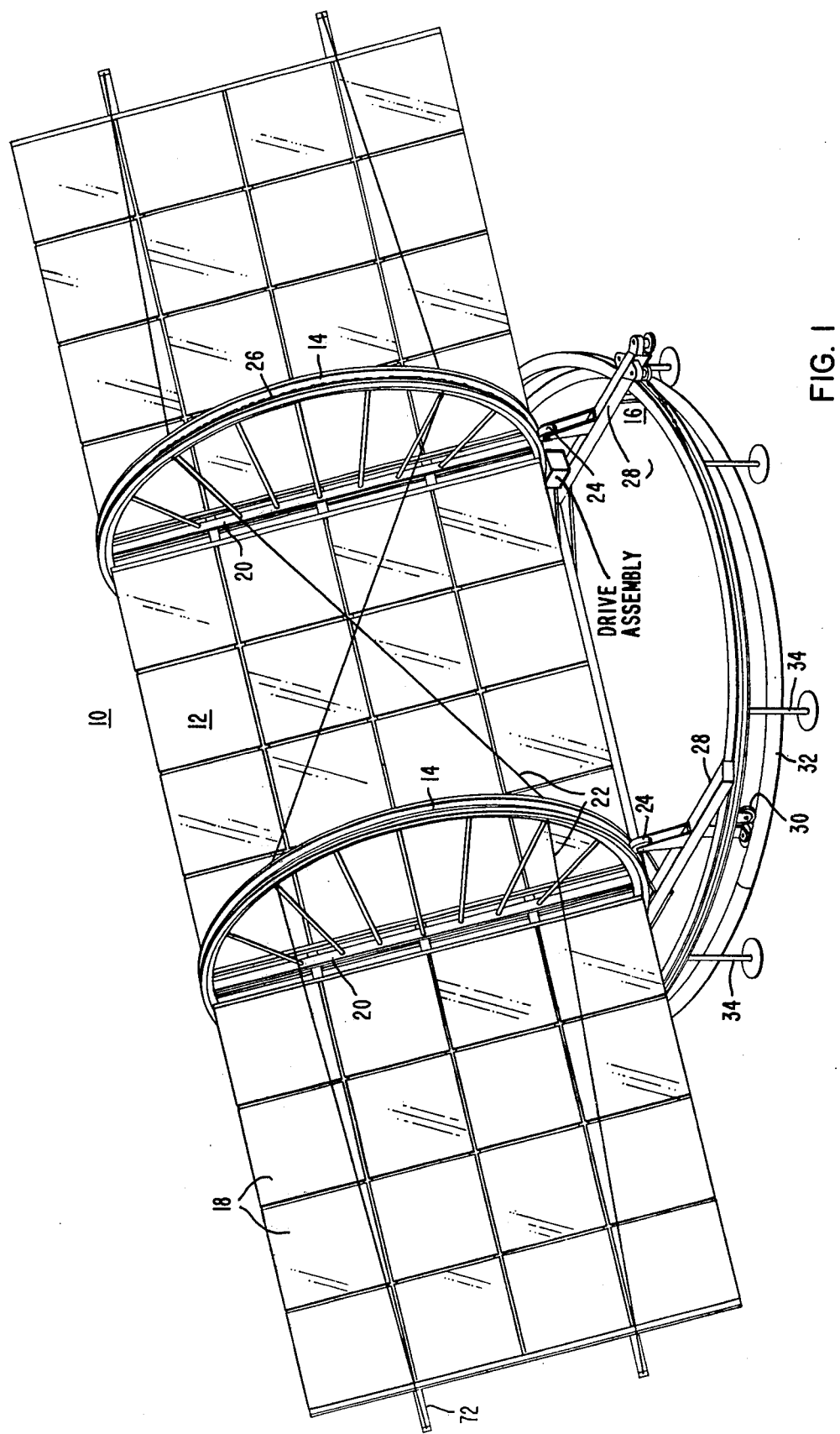
FIG. 1 is a perspective view of a heliostat assembly in accordance with the invention.

Referring now to FIG. 1, there is shown a heliostat assembly 10 in accordance with the invention. The major structures of the assembly, described in additional detail hereinafter, include a reflective surface or mirror assembly 12, two elevation rims 14 and a support and drive structure 16. The exemplary mirror assembly 12 includes forty-eight square flat mirrors 18 arranged in a four by twelve rectangular array thirty-six feet long and twelve feet wide. The array is substantially flat, having an equivalent radius of curvature of approximately three thousand feet along both the length and width dimensions. The elevation rims 14, preferably circular, are spaced twelve feet apart in planes perpendicular to the mirror assembly 12. The rims can also be semi-circular or can include any segment of an arc. The rims 14 are approximately twelve and one-half feet in diameter, with the mirror assembly 12 disposed diametrically therein. The rims 14 are affixed to the mirror assembly 12 and cooperate with each other through affixing means such as bolts, support bars 20 and tension members such as spring loaded cables 22.

The elevation rims 14 and mirror assembly 12 are supported on the support and drive structure 16 which includes four, six inch roller wheels 24, two cooperating with each rim at positions spaced approximately six feet apart. A belt or chain 26 cooperates with a drive assembly to rotate the rims and mirrors and vary the angle of elevation of the mirror assembly 12. The four rollers and support wheels 24 are attached to a carriage assembly such as the H-shaped frame 28. The H-frame 28 includes four additional roller wheels 30 located to run along a circular azimuth ring 32, sixteen and one-half feet in diameter. Another belt-type drive or geared system cooperates with the H-frame 28 to vary the azimuthal angle of the mirror assembly 12. The azimuth ring 32 is affixed to eight equally spaced vertical supports 34 which provide support and leveling of the entire heliostat assembly.

Figure 2:
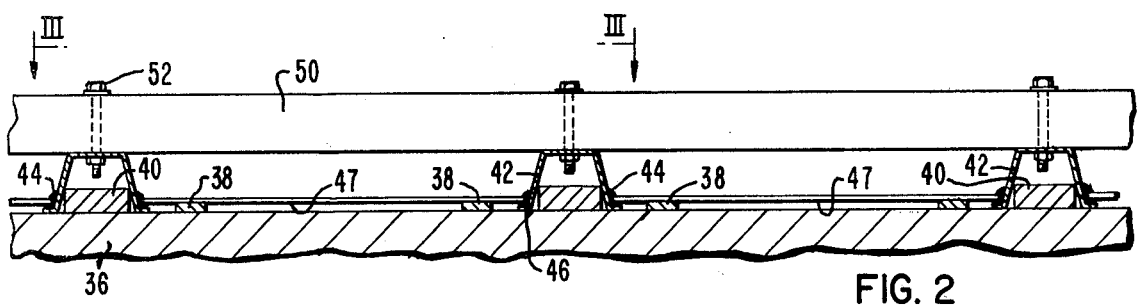
FIG. 2 is an elevation view of a portion of a mirror assembly during fabrication in accordance with an embodiment of the invention.
Figure 3:
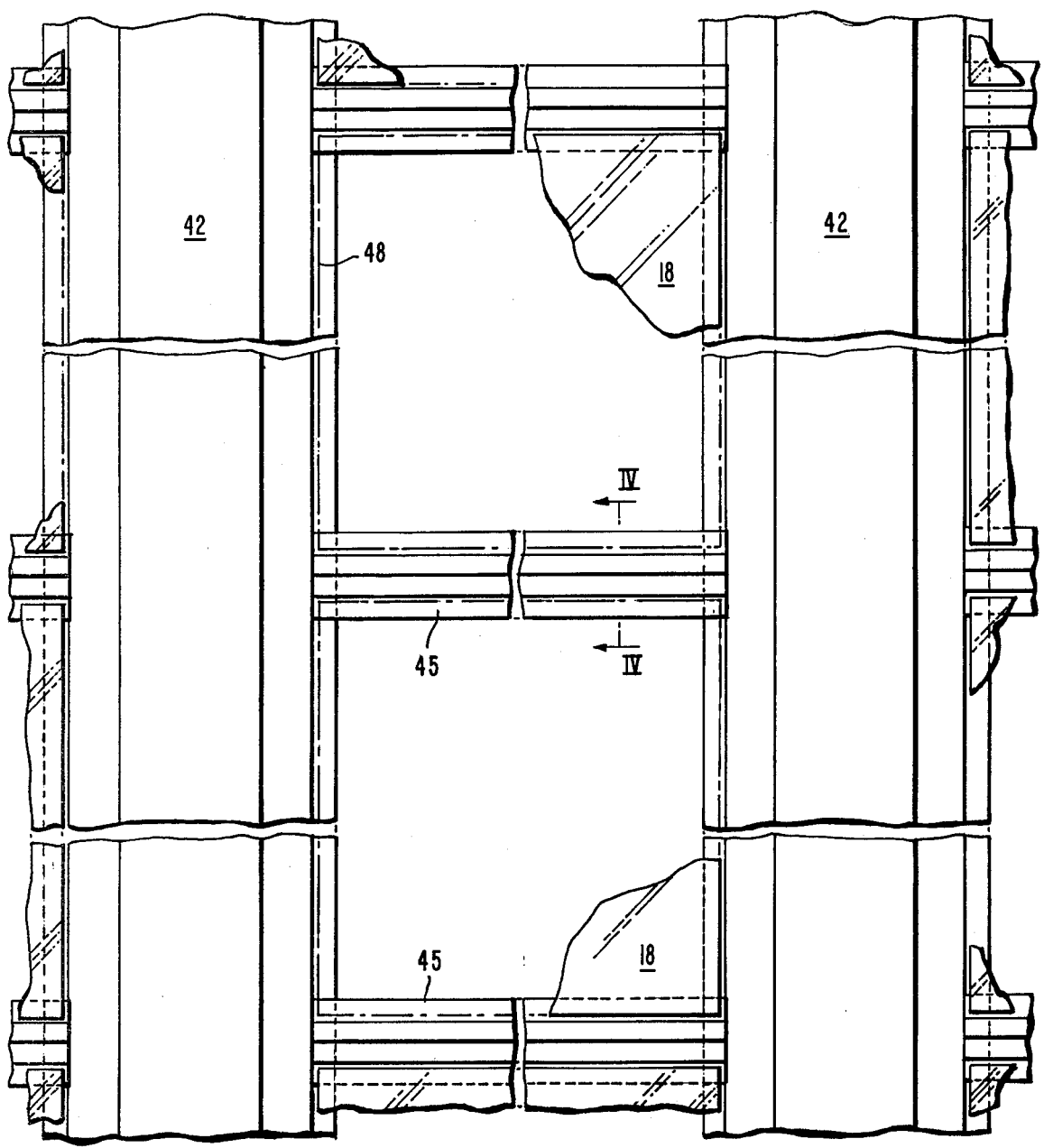
FIG. 3 is a plan view taken at III—III of FIG. 2.
Figure 4:
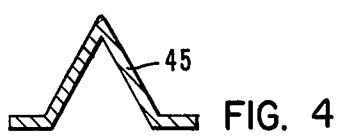
FIG. 4 is a section view, taken at IV—IV of FIG. 3.

Preferred mirror assembly constructions and methods of fabrication are described with reference to FIGS. 2 through 5. FIG. 2 shows a mirror assembly which is built up upon a mold or reference plane 36. The plane 36 is preferably flat to a degree consistent with the required precision for mirror aiming. Mirror aiming spacers 38 are placed upon the reference plane 36, and can be permanently affixed thereto in a fabrication shop or a similar field installation. Beam locating blocks 40 are also affixed to the plane 36 and vertical flanged beams 42 are placed over the blocks, preferably with a bonding agent such as a bead of epoxy 44 on the flanges 46. An exemplary epoxy is No. 2216 gray flexible epoxy, commercially available from the 3-M Corporation. The beams 42 preferably extend the twelve foot width of the mirror assembly. Placed between and perpendicular to the beams 42 are smaller cross supports, approximately three feet in length, such as the flanged V-shaped supports 45 shown in FIGS. 3 and 4. Locator blocks can also be used to properly orient the V-supports 45 which are also put in place with epoxied flanges. The individual back-silvered mirrors 18 are then laid in place on the epoxy (as illustrated by the dot-dash line 48 of FIG. 3), with the mirror face 47 downward, such as by a vacuum jig which can lower into place a number of mirrors simultaneously. Subsequently, cross beams 50 (FIG. 2) are placed across the vertical beams 42, preferably parallel to the V-shaped beams 45, and attached to the vertical beams 42 at each junction, such as by mechanical fasteners 52.

It will be evident that once the epoxy sets, the mirror assembly 12 can be removed and packaged for shipment in its substantially flat configuration, the mirrors 18 being previously aimed by the spacers. This assembly 12 will resist bending, but have less resistance to torsion. Accordingly, when received in the field, the assembly 12 can be again placed face down on a similar flat reference plane and the elevation rims, which substantially increase the torsional characteristics, fastened in place, preferably in the form of four semi-circles.

Figure 5:
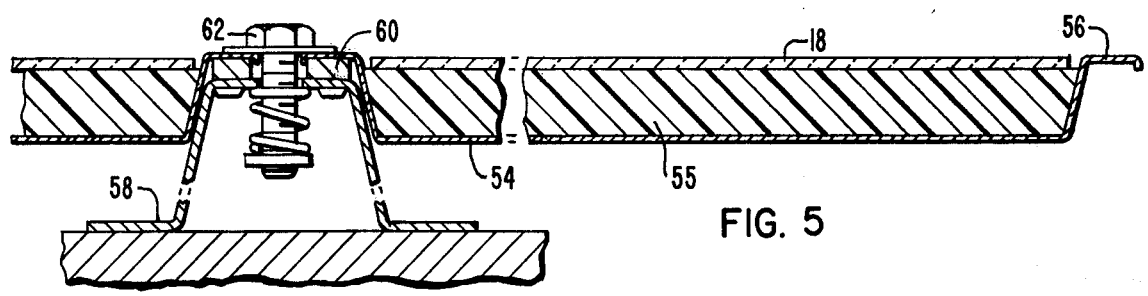
FIG. 5 is an elevation view, in section, of an embodiment mirror construction in accordance with the invention.
Figure 6:
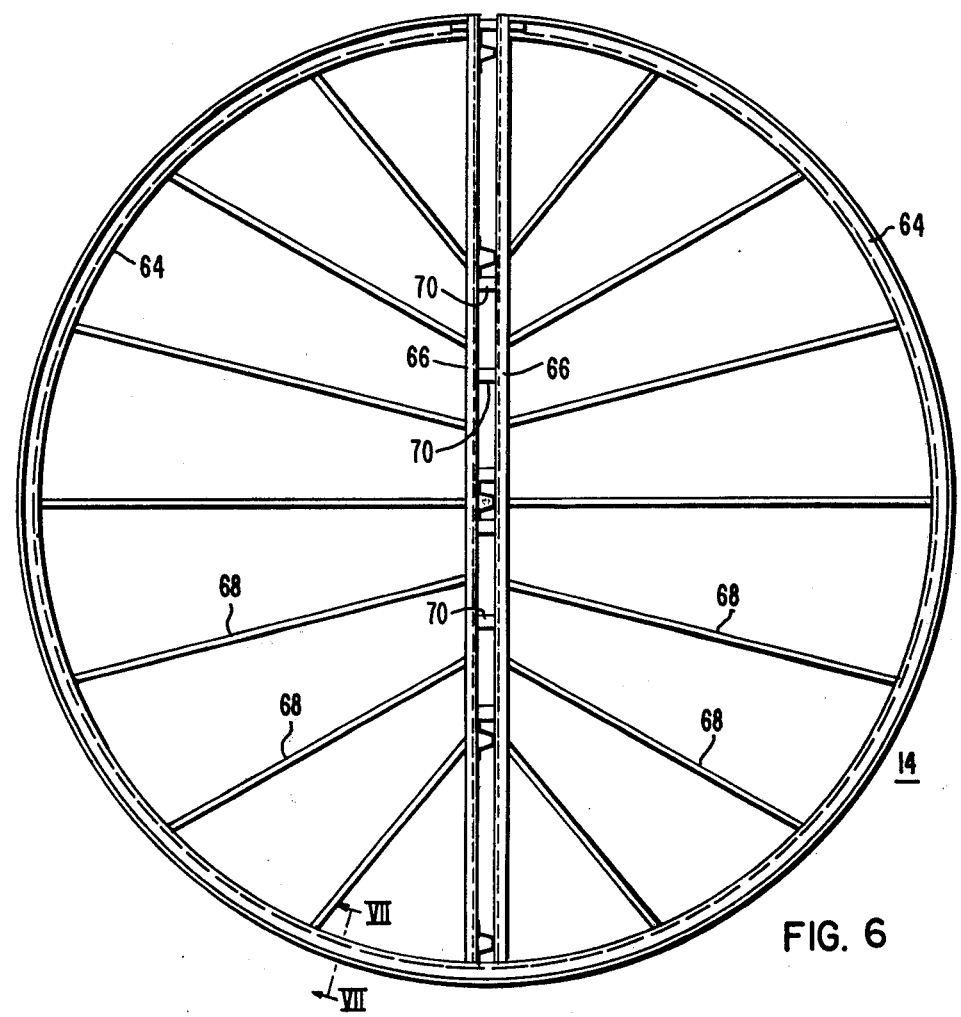
FIG. 6 is an elevation view of an elevation rim of the invention.

Another construction for the mirror assembly, which provides the required rigidity and aiming precision while additionally providing damping to resist hail impact, is shown in FIG. 5. Here the individual three foot by three foot back silvered mirrors 18 are each supported about their periphery by a formed steel pan 54 which protects the mirror edges against damage. The mirrors are preferably single strength float glass, 0.092 inch thick, backed with a rigid plastic 55 foamed in place within the pan, and atop of which the glass is bonded. The plastic 55 can include a bonding agent to which the glass directly adheres, or a separate bonding agent can be disposed between the plastic and glass. The flanged edges 56 of the pan 54 are supported on beams 58 with variable thickness aiming pads 60 disposed therebetween. The angle of each pan 54 and mirror 18 is adjusted by varying the thickness of the surrounding pads 60. The flanges 56 of the pans are affixed to the pads 60 and beams 58 by a spring-loaded clip 62. This construction allows for ease of mirror replacement or reaiming in the field in the event such is required.

Figure 7:
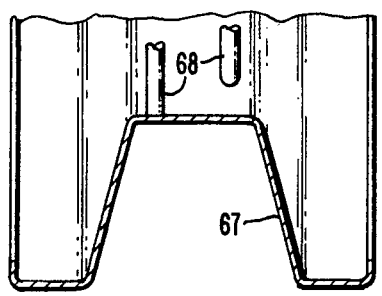
FIG. 7 is a perspective view of a rim cross-section partially sectioned as at VII—VII of FIG. 6.
Figure 8:
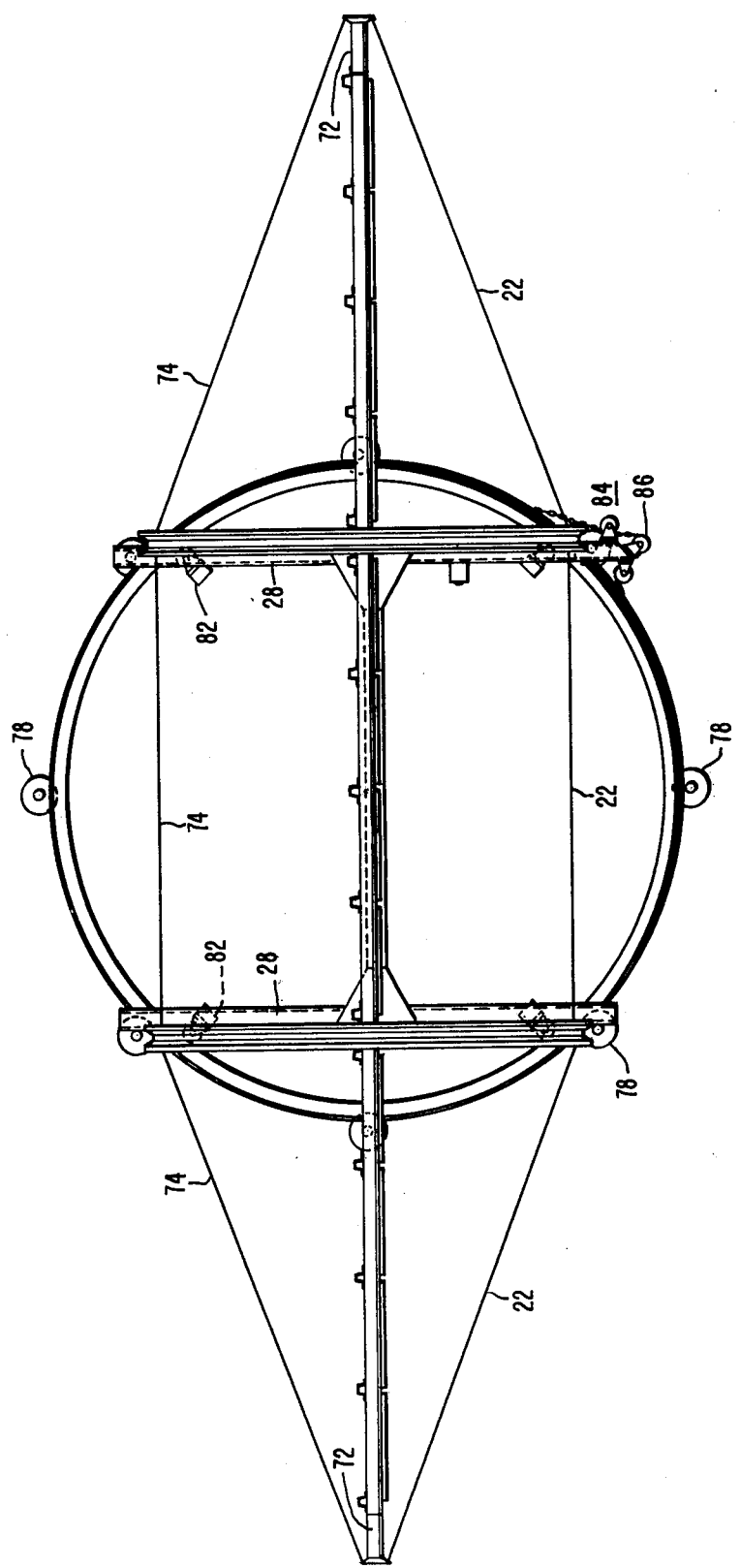
FIG. 8 is a top view of a heliostat assembly in accordance with the invention.

The mirror assembly 12 is attached to the two elevation rims 14, as shown best in FIGS. 1 and 6 through 8. The rims are preferably circular with a diameter substantially the same, or slightly larger than, the width of the mirror assembly 12, and are twelve and one-half foot diameter in the exemplary embodiment. The rims preferably are made up of two semi-circles 64, each closed diametrically by a three inch wide channel 66. The periphery of the rims is preferably a deep section roll formed curved beam 67, as shown in FIG. 7, to provide a channel for the roller wheels 24. In order to maintain a lightweight structure and alleviate wind loadings, the rims are generally hollow, and can, but need not, include support members such as $\frac{3}{8}$" diameter spokes 68. The diametral channels 66 are preferably bolted to the mirror assembly 12, and to each other, through pipe spacers 70, 2$\frac{1}{2}$ inches in length. The rims are further affixed to each other and to the mirror assembly through the extensions 72, spring-tensioned cables 22 and truss rods 74 (FIGS. 1 and 8). The semi-circles 64 are preferably shipped to a field site flat and, when bolted together in the field with the mirror assembly between, the ends butt together and the spokes 68, if utilized, are tensioned.

The elevation rims and mirror assembly are supported upon the four roller wheels 24. A rim is rotated to track the apparent elevational motion of the sun by the link chain 26 tensioned about one or both of the rims. A safety bar can be placed at the low point or at each roller wheel 30 to prevent lift-off of the rims in the event of a high wind. The six inch diameter roller wheels 24 are affixed to and above the H-frame 28 carriage along the legs of the H-shape. The four azimuthal six inch diameter roller wheels 30 are affixed to and below the H-frame 28 at the extremities of the H-shape, and can include a ridge matingly sized to the azimuth ring. The wheels 30 are disposed to run along a ridge of the circular azimuth ring 32 which can comprise a circular cross-section, such as a four inch, schedule forty pipe bent into a sixteen and one-half foot diameter. Additional restraints can be utilized to properly maintain the roller wheels 30 in position on the azimuth ring 32, such as safety restraining hooks.

Figure 9:
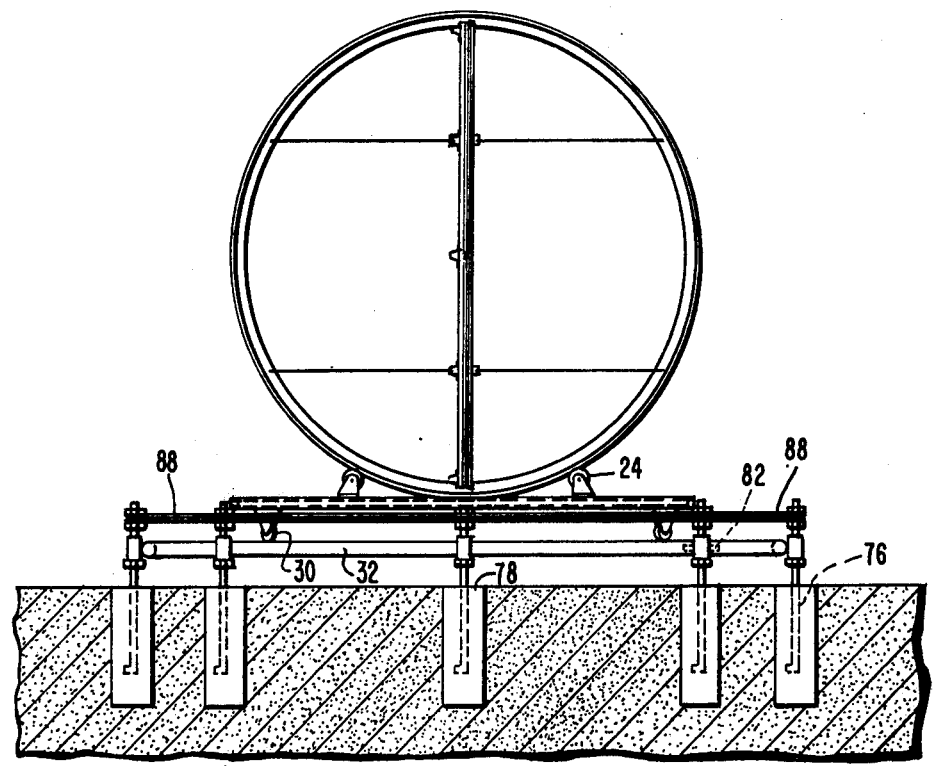
FIGS. 9 and 10 are respectively side and front elevation views of the heliostat assembly in FIG. 8.
Figure 10:
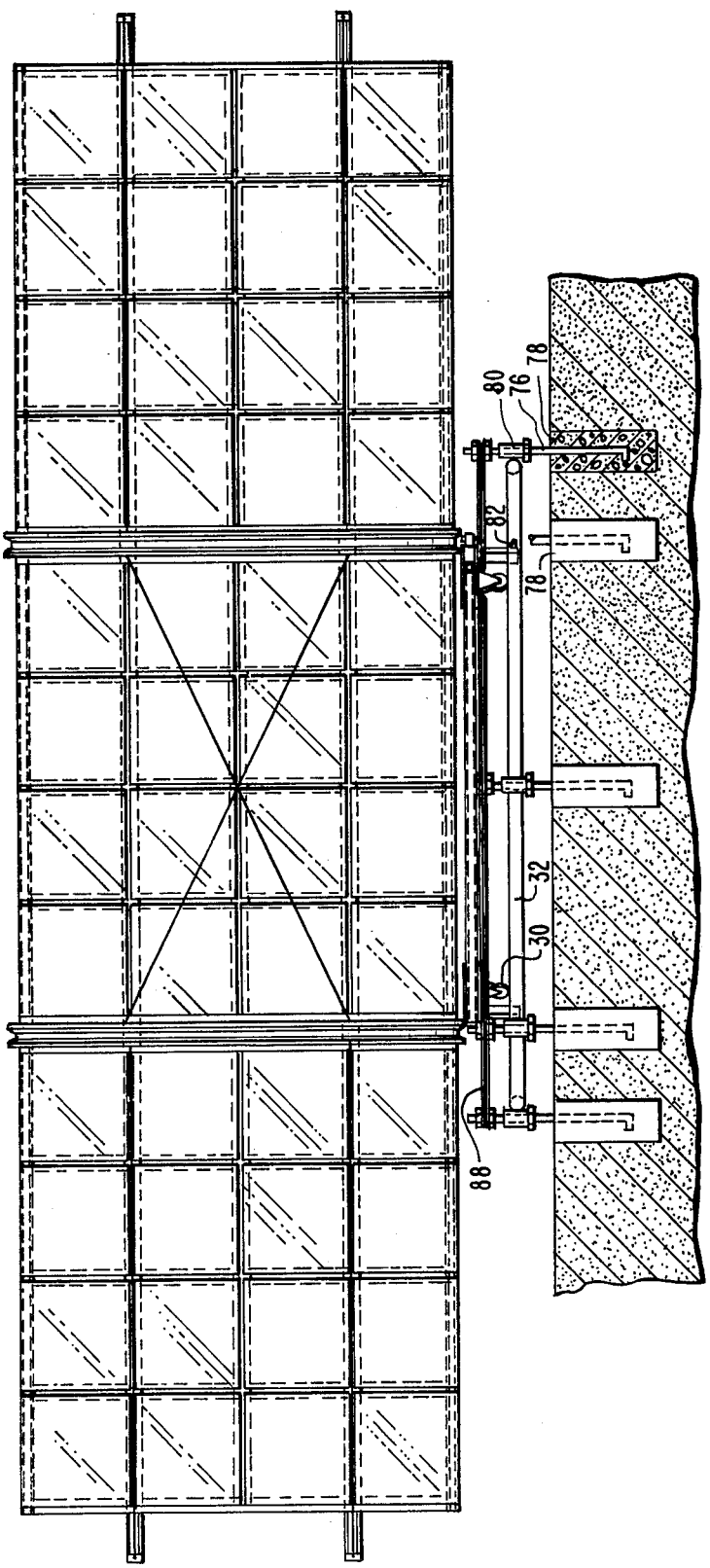

The azimuth ring 32 is affixed to eight equally spaced anchor bars 76 (FIGS. 9 and 10) set in concrete or other supportive piers 78. The connection between the azimuth ring 32 and the piers 78 is preferably adjustable to facilitate leveling, such as by threading the anchor bars 76 and mating tubes 80, the tubes 80 being welded to the azimuth ring 32. In order to better accommodate horizontal shear loads, four radially oriented wheels 82 (FIGS. 8, 9 and 10) can also be attached to the underside of the H-shaped carriage 28, which bear upon the inside of the azimuth ring.

The heliostat assembly 10 is driven to track the apparent azimuthal motion of the sun, preferably by a chain and sprocket assembly 84, or, for example, a geared motor, affixed to one leg of the H-shaped carriage 28. The motor sprocket engages a horizontal drive chain 86 anchored to and tensioned within a circular channel 88 supported just below the carriage 28.

It will be apparent to those skilled in the art that the disclosed heliostat offers substantial advantages in terms of operation, fabrication, maintainability and cost, particularly in view of the relatively lightweight, yet high strength, construction. A heliostat in accordance with the invention can be readily produced from commonly available forms and shapes with conventional equipment conducive to high quality and quantity production techniques. The overall structure is relatively simple and can be readily assembled at a remote field location. And, although a specific exemplary embodiment has been described, the construction is readily adaptable to dimensional variations, as required by field, target and overall solar plant parameters.

Additional benefits include high reliability, for example, as brought about by the preferred rounded surface of the azimuth ring which resists accumulation of sand or other particulate matter. The carriage assembly, being driven by a chain-type drive over relatively large diameter wheels, presents a significant torque and positioning advantage. Similarly, an elevation rim drive motor assembly, which can also be mounted on the carriage, presents a torque and positioning advantage. The heliostat assembly also lends itself to shop fabrication and field assembly with resulting transportation advantages. The structural materials are commonly available, and preferably comprise noncorrosives, such as galvanized carbon steel which can be spot-welded as necessary. The roller wheels, particularly those associated with the azimuth drive, can comprise a high strength plastic with a peripheral groove, easily molded as opposed to cast, forged and machined steel wheels.

Additionally, the generally low and wide stance of the heliostat assembly provides a high resistance to overturning moments. Under strong storm conditions, such as hail, the heliostat can easily be positioned with the mirrors face down to alleviate damage. And, in the event of mirror damage, the spring-loaded clips and aiming pads result in an easily reparable structure which does not require special procedures for reaiming. Similarly, in the event of ground or foundation motion, an adjustable foundation connection allows ready releveling. Many other advantages exist and, it will be apparent, that additional modifications can be made without departing from the scope of the invention.

I claim:

1. A heliostat assembly comprising:
a plurality of mirrors affixed in a generally flat array having a front surface;
a plurality of curved elevation rims affixed to and extending substantially perpendicular to said mirror array, said rims including a portion disposed in front of said front surface substantially parallel to said front surface;
means for rotating said rims so as to vary the elevational angle of said mirror array whereby upon rotation to said portion said front surface is disposed downwardly.

2. The heliostat assembly of claim 1 wherein said curved elevation rims are arcuate.

3. The heliostat assembly of claim 2 wherein said curved elevation rims are circular.

4. The heliostat assembly of claim 2 further comprising tension members affixing said plurality of rims to one another and to the periphery of said mirror array.

5. The heliostat assembly of claim 1 wherein said means for rotating comprise rollers cooperatively associated with said rims and drive structure for rolling said rims over said rollers.

6. The heliostat assembly of claim 5 wherein at least a portion of the weight of said rims and mirrors is supported directly by said rollers.

7. The heliostat assembly of claim 5 wherein said drive structure comprises a belt-type drive acting upon the periphery of one of said elevation rims.

8. The heliostat assembly of claim 1 further comprising means for rotating said rims so as to vary the azimuthal orientation of said mirrors.

9. The heliostat assembly of claim 1 wherein said mirror array is substantially rectangular having a length and a width, said elevation rims are vertically oriented, substantially circular, and of a diameter substantially similar to said width.

10. The heliostat assembly of claim 9 further comprising a support bar affixed to said mirror array along said width and diametrically affixed to one of said substantially circular rims.

11. The heliostat assembly of claim 10 wherein said one circular rim is substantially hollow and further comprises support spokes extending from said rim to said support bar.

12. A heliostat assembly comprising:
a plurality of mirrors affixed in a generally flat array;
a plurality of curved elevation rims affixed to and extending substantially perpendicular to said mirror array, said rims extending both in front of, and behind, said array;
a plurality tension members affixing said plurality of rims to one another and to said mirror array; and
means for rotating said rims so as to vary the elevational angle of said mirror array.

* * * * *